United States Patent [19]

Rechtschaffen et al.

[11] Patent Number: 5,802,338

[45] Date of Patent: Sep. 1, 1998

[54] METHOD OF SELF-PARALLELIZING AND SELF-PARALLELIZING MULTIPROCESSOR USING THE METHOD

[75] Inventors: Rudolph Nathan Rechtschaffen, Scarsdale; Kattamuri Ekanadham, Yorktown Heights, both of N.Y.

[73] Assignee: International Business Machines Corporation, Armonk, N.Y.

[21] Appl. No.: 724,633

[22] Filed: Oct. 1, 1996

[51] Int. Cl.⁶ .................................................. G06F 9/38
[52] U.S. Cl. ................................. 395/393; 395/392
[58] Field of Search ........................... 395/390, 391, 395/392, 393, 394, 800, 581, 586, 591

[56] References Cited

U.S. PATENT DOCUMENTS

| | | | |
|---|---|---|---|
| 4,574,349 | 3/1986 | Rechtschaffen | 395/481 |
| 4,992,938 | 2/1991 | Cocke et al. | 395/393 |
| 5,226,126 | 7/1993 | McFarland et al. | 395/394 |
| 5,297,281 | 3/1994 | Emma et al. | 395/392 |
| 5,347,639 | 9/1994 | Rechtschaffen et al. | 395/581 |
| 5,355,457 | 10/1994 | Shebanow et al. | 395/394 |
| 5,412,784 | 5/1995 | Rechtschaffen et al. | 395/800 |
| 5,434,985 | 7/1995 | Emma et al. | 395/587 |
| 5,511,172 | 4/1996 | Kimura et al. | 395/582 |
| 5,581,719 | 12/1996 | Steely, Jr. et al. | 395/383 |

*Primary Examiner*—Parshotam S. Lall
*Assistant Examiner*—Viet Vu
*Attorney, Agent, or Firm*—Ratner & Prestia

[57] ABSTRACT

An apparatus and method for self-parallelizing and executing a sequence of instructions. During a first mode of operation, instructions are executed concurrently with the parallelizing of instructions sequences not already parallelized. During a second mode of operation, instruction sequences already parallelized during the first mode are executed in parallel asynchronously by separate processors. The separate processors share a common register file. The processing elements rename the registers used by the instructions that modify registers so when instructions are executed in parallel the result of the executions appear in the common set of registers accessible to all the processing elements. There is no need to send and receive obligation to resolve register set/use requirements implied by the sequential execution sequence.

20 Claims, 7 Drawing Sheets

METHOD OF SELF-PARALLELIZING AND SELF-PARALLELIZING MULTIPROCESSOR USING THE METHOD

BACKGROUND OF THE INVENTION

1. Field of the Invention

The present invention generally relates to stored program digital computers and more specifically to a computer system and method in which execution sequences of instructions are executed in two modes of execution, the first execution mode being used not only to execute instructions but also simultaneously to parallelize instruction sequences which have not already been parallelized, while the second mode is used to execute in parallel, on separate processing elements, instruction sequences which have been already parallelized. The present invention also relates to the parallelized form of the instruction sequences.

2. Description of the Prior Art

One way of executing a digital computer program faster is to execute several of its parts in parallel on separate processors. One way of doing this is to define a programming environment and computer system so that programs can be written for execution in such a parallel fashion. Unfortunately, many useful programs have been created already in which sequential execution of the instructions has been assumed. It is desirable to be able to execute these sequential programs faster also, so some effort has been made in the prior art to parallelize such programs for execution in parallel.

Most of the prior work in this area relies on creating a parallel specification of the program. This has been accomplished in several ways. Sophisticated compilers have been created which parallelize programs and generate code for a multi-processor system having a number of conventional processors. Some of these compilers uncover the parallelism automatically (e.g., "Advanced Compiler Optimizations for Supercomputers" by D. A. Padua and M. J. Wolfe in Comm. of ACM, Vol. 29, page 12 et seq., December 1986). Others take cues from programmer-supplied annotations (e.g., "Programming for Parallelism" by Alan H. Karp in Computer, Vol. 20, Page 5 et seq., May 1987). Another approach is to create specialized hardware that is amenable for parallel execution, such as vector processors, VLIW architectures, etc. Here again a compiler translates sequential programs into code suitable for use on these machines. The compiling effort in these cases is substantial. A more radical approach has been to create an inherently parallel execution mechanism, such as a dataflow machine (See "Dataflow Supercomputers" by J. B. Dennis in Computer, Vol. 13, page 11 et seq., November 1980), and a declarative specification for a program which automatically generates parallel code for use on that mechanism (See "Future Scientific Programming on Parallel Machines" by Arvind and K. Ekanadham in the Jour. of Parallel & Distributed Computing, Vol. 5, December 1988).

In all of the foregoing approaches, the task of parallelizing the computer program and determining that it is safe to execute different parts in parallel is done either at the compiler level or even earlier at the programming level (i.e., ahead of any actual productive execution of the code with data). The processors play no role in determining whether it is safe to execute different parts in parallel at execution time because this determination has been made already by either the programmer or the compiler.

Another approach is to bring unparallelized code to a multi-processor system at execution time and give the multi-processor system an active role in splitting up the code for parallel execution and in determining whether the parallel execution of the code is valid. This approach may be distinguished from the others in that execution of at least some of the instructions is done provisionally. It is not generally known ahead of execution whether the parallel execution is totally valid. Such an approach is exemplified by the following references.

In U.S. Pat. No. 5,297,281 entitled "Multiple Sequence Processor System", commonly assigned to the assignee of the this patent application, instructions are divided into groups in accordance with some delimiting rule and then at least two groups are executed in parallel. One of the groups of instructions is sequentially earlier than all of the others and a correct execution of the earliest group is assumed, while the later groups are only provisionally executed in parallel. Later groups of instructions read data from registers and memory locations just as if earlier groups of instructions have already been executed. Controls monitor whether any data used by a later group of instructions is changed (after it has been used by the later group) by instructions in an earlier group. Stores to memory locations and registers by the later groups are done only temporarily in a separate place. If all of the data used by a later group is valid (i.e. not changed by an earlier group), the results of that later group are valid and can become committed. If not, that later group is re-executed.

In U.S. Pat. No. 4,825,360 a similar scheme is used in that instruction groups are being provisionally executed in parallel and then confirmed in sequence. However, in this scheme the chances for success have been enhanced through a compilation step and through a reduction (and preferable elimination) in side effecting instructions other than as the final instruction in a group. As a consequence, it is not clear that this system can be used to parallelize conventional sequential code.

In U.S. Pat. No. 4,903,196, a uniprocessor parallelizes code for execution on separate asynchronous execution units and the execution units wait for each other, if necessary, to avoid using data which will be modified by instructions earlier in conceptual order until those instructions have been executed. There is only one set of general purpose registers (GPRs) and only one decoder. A series of special purpose tags are associated with each GPR and execution unit in the uniprocessor. The tags allow the multiple execution units to be concurrently executing multiple instructions using the GPRs sequentially or different GPRs concurrently while at the same time preserving the logical integrity of the data supplied by the GPRs to the execution units. The tags associated with each GPR and each execution unit store a sequence trail between the individual GPRs and execution units so that before a given execution unit is permitted to store into a particular GPR, the immediately preceding store into that particular GPR by a different execution unit must have been completed. Also, the tags assure that all reads from a given GPR by one or more execution units are completed before a subsequent store operation to that GPR is allowed to occur.

In U.S. Pat. No. 5,347,639 proposed by the authors of the present invention, a self parallelization scheme is implemented where the target parallelization engine is comprised of n identical processor elements, each scheduled through the analysis of a single execution sequence. These processor elements, in the parallel mode of operation, will execution their individual portion of the original execution sequence by using their own set of general purpose registers. The analysis of the sequential execution sequence establishes which instructions set the values of registers that other instructions use. When such set/use pairs of instructions are scheduled on different processor elements a need exists to establish sending and receiving obligations between such instructions. The receiving obligation associated with an instruction prevents the processor element from using the current value within its own set of general purpose registers as input for a given instruction when within the sequential execution sequence an intervening instruction, executed by another processor element, has set a new value for that register. The sending obligation on the setting instruction sends the currently correct value of the register, properly tagged, to the using processor element.

Further, the timing of an instruction relative to the availability of its inputs and the scheduling of instructions relative to other instructions scheduled on the same processor element must be done so that the instructions scheduled on a given processor element are scheduled in their original conceptual order. This allows, within a given processor element, for conceptually later instructions to use the results of conceptually earlier instructions when there is no receiving obligation that overrides such a use.

Two other important aspects of parallelization that are relevant to present invention. The first involves the handling of store-then-fetch conditions when a store instruction and fetch instruction that target the same memory location are executed by different processor elements. The second involves restoring the machine state at the end of a parallelization or following a branch wrong guess. The former is controlled via a set of FETCH/STORE tables that interface the set of processor elements to the memory of the system. The latter involves a new set of sending obligations between the last instruction within each level of conditionality that sets a register and a state generating mechanism.

In U.S. Pat. No. 5,412,784 proposed by the authors of the present invention, a self parallelization scheme is augmented so that the parallel code generated is branch enterable. Within each partitioned sequence of code generated from a given parallelization a entry point is identified. The set of such entry points, one for each processor element is called a profile. The parallelization can be entered along a contour and all aspects of the parallelization remain valid. This gives the parallel code the property commonly associated with sequential code that allows it to be entered at any point and executed from that point on.

In U.S. Pat. No. 4,574,349 proposed by one author of the present invention, a register renaming scheme is proposed that allows a processor to address a larger number of registers than are identified by an instruction. This operation called register renaming is done within a register correspondence table that at each point in time associates one of a plurality of hardware registers with a given architectured register. This association is maintained with the processor during the execution of the instruction and the result of the execution is used to update the hardware register.

SUMMARY OF THE INVENTION

It is an object of this invention to provide for efficient parallel execution of several portions of a computer program, while giving the appearance that the program has been executed sequentially.

This and further objects are accomplished in accordance with this invention by a self-parallelizing computer system and method in which a single execution sequence of instructions is partitioned into a set of instruction subsequences, each instruction subsequence being executed on a different one of a set of separate processing elements that share a common register file. This machine and method has been named SPURR (Self-Parallelization Using Register Renaming).

The processing elements rename the registers used by the instructions that modify registers so that when the instructions are executed in parallel mode the result of the executions will appear in the common set of registers accessible to all the processing elements. Each instruction within the sequential execution sequence that modifies a register get assigned the next higher number register from the common register pool. The architected register that modified in this instruction is now renamed to this hardware register and so identified within the register correspondence table. Conceptually subsequent instructions that require this register as input will now be associated with the renamed common register and derive their input from the result of the execution of the register modifying instruction. As such there is no need for sending and receiving obligation to resolve register set/use requirements implied by the sequential execution sequence. As such, a single instruction stream is dynamically renamed to used a common expanded register file and the individual instructions can be scheduled on a set of processor elements consistently with with the following simple restrictions: no more than n instructions are scheduled to execute in parallel on the same cycle (OCCUPANCY RULE), and no instruction is scheduled to execute on a cycle prior to the availability of all its inputs (DEADLOCK AVOIDANCE).

BRIEF DESCRIPTION OF THE DRAWINGS

The foregoing and other objects, aspects and advantages of the invention will be better understood from the following detailed description, which refers to the drawings, in which.

DETAILED DESCRIPTION OF A PREFERRED EMBODIMENT

Figure 1:
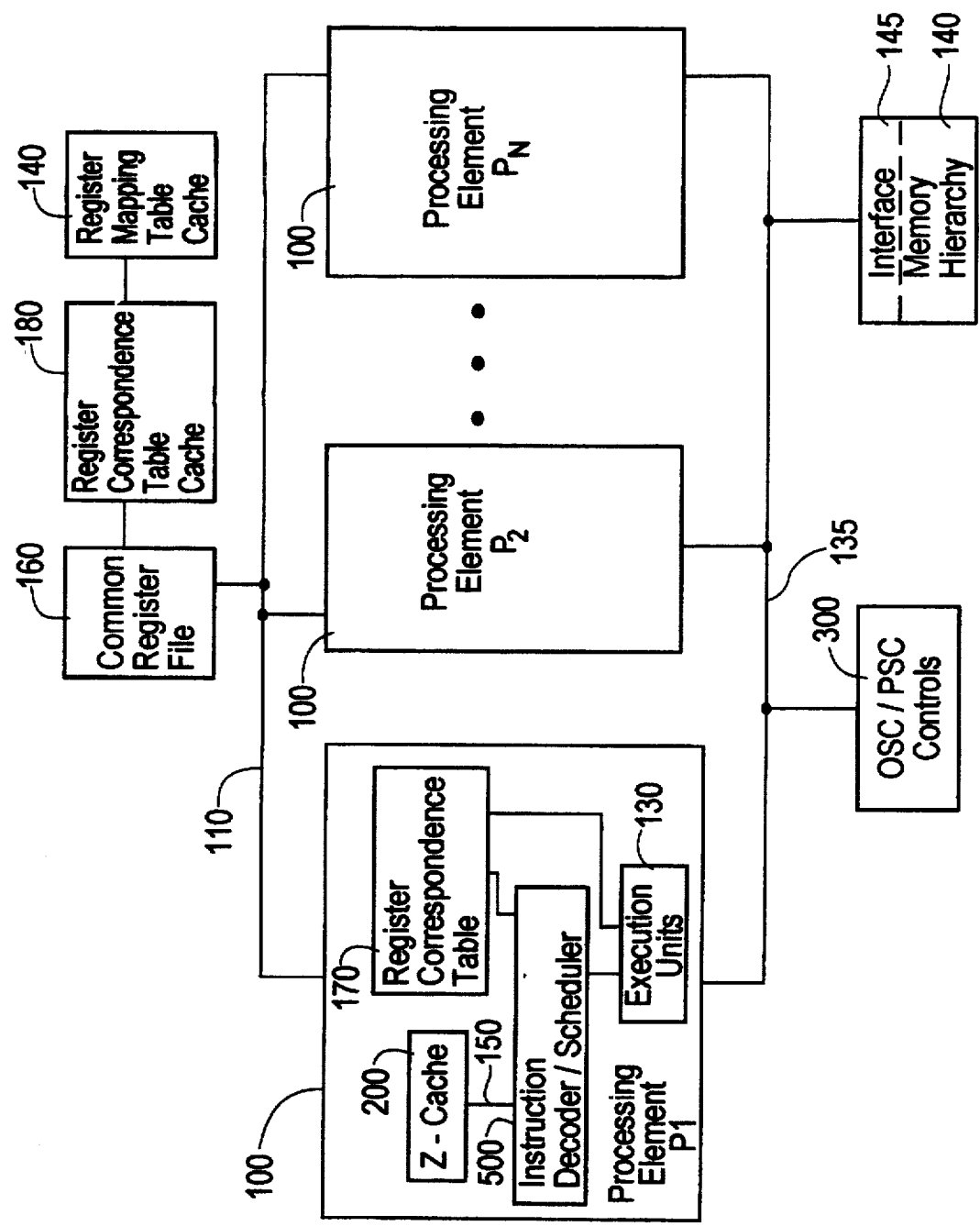
FIG. 1 is a block diagram of a preferred embodiment of a self-parallelizing processing system in accordance with this invention.

The following description of the preferred embodiment of SPURR will be subdivided into 6 Sections, the first three sections referencing one or more figures having the same first number as the Section. FIG. 4 is associated with Section 5. The description consists of the following Sections:

Section 1 OVERVIEW OF SPURR ORGANIZATION
Section 2 PRIVATE Z-CACHES
Section 3 MONITORING FOR OPERAND STORE COMPARE
Section 4 HANDLING BRANCHES
Section 5 ASSIGNMENT OF INSTRUCTIONS TO PROCESSING ELEMENTS IN E-MODE AND INSTRUCTION PROCESSING
Section 6 PROCESSING IN THE Z-MODE

SECTION 1 OVERVIEW OF SPURR ORGANIZATION

The present invention is a uniprocessor organization in which a set of processing elements, that share a common register file, work in concert to execute successive segments of the instruction stream. Each processing element is capable of decoding instructions, generating memory operand addresses, executing instructions and referencing and updating the set of common registers addressed by the instructions executing in parallel mode. These processing elements act in concert during the first execution of a program segment to rename registers and to create separate instruction streams or instruction subsequences from the original segment and to store them. These separate instruction subsequences corresponding to a segment are a parallelized form of the original segment and are called Z-Code. This is a true partitioning in the sense that each instruction from the original segment is placed in only one of the created subsequences in the parallelized Z-Code form. Subsequent re-execution of the same program segment is much faster, since each of the processing elements decodes and executes only the instructions which it has assigned to itself during the first execution of that segment and the other processing elements are concurrently doing the same for their own assigned instructions.

Segments are either P-Segments or Z-Segments. A P-Segment is a sequence of consecutively executed instructions (i.e., a normal segment of a uniprocessor instruction stream), which is processed in a first mode of execution (called "E-Mode") with data to produce not only the usual results of execution with data but also to produce one or more Z-Segments. If a program segment is executed again when the corresponding Z-Segment is available, the Z-Segment is processed by SPURR in place of the P-Segment in a second mode of execution (called "Z-Mode").

The main difference between E-Mode and Z-Mode is that during E-Mode all processing elements see all instructions in the P-Segments but only execute the instructions assigned to them. During Z-Mode each processing element not only executes only the instructions it assigned to itself it but also only sees and decodes those instructions.

The results of the sequential execution of the program in the E-Mode establishes all the information requirements that are necessary to handle exceptional conditions that can arise during the Z-Mode. For each branch instruction the register correspondence table that associates the architected registers used by the original program and their renamed counterparts is preserved. This information is associated with the parallel execution entity called the Z-Code. If the branch when executed in Z-Mode does not have the same target and action that occurred during E-Mode a branch wrong guess is said to have occurred. The saved correspondence table associated with the branch is then used to extract the system state from the common register file and allow the processing of the next segment to begin properly.

In order to stop a Z-Code following the recognition of a branch wrong guess a means is required to assure that all instructions that precede the branch have been executed. In a system which allows the processing elements to execute instructions out-of-sequence, the manner in which this assurance can be guaranteed involves the concept of a processor element level of conditionality.

Segments in SPURR are further broken down into levels of conditionality. The level of conditionality of an instruction is the number of branch instructions that precede it in the segment. The level of conditionality starts at zero and is incremented following each branch instruction. The maximum number of levels of conditionality per segment is limited by the hardware resources in SPURR and a P-Segment in SPURR can be terminated in the E-Mode before this limit is reached. Although the branch instruction is processed by only a single processor element in the Z-Mode, the E-Mode allows all processor elements to see the branch instruction and thus the level of conditionality of all instruction assigned to a processor element is known by all processor elements. In a system where instructions are processed in their original sequence the recognition by a processing element that an instruction with the higher level of conditionality has been processed by that processor element assures that all instructions with smaller level of conditionality have been processed by that processor element. When out-of-sequence instruction scheduling is permitted another procedure is employed. For each branch instruction, within the schedule for each processor element, the instruction which is scheduled on the latest cycle is tagged with the level of conditionality of the branch and this is interpreted as the processor element level of conditionality. This entry assures that all instructions with a lower level of conditionality that are scheduled on this processor element are scheduled prior to this tagged instruction.

In the preferred embodiment, only data flows through registers (or register equivalents) is observed and recorded in the Z-Code and then recreated in the Z-Mode. If the E-Code stores data into main memory and then later reads the same data from main memory (as opposed to storing into a register and then later using the data in that register), this data flow is not recreated in the Z-Mode. It is assumed that data flows handled through a store to main memory will not often result in having one processing element need the data before the processing element that produces it has actually generated it. In the preferred embodiment, this unlikely error condition is detected if it occurs.

When an error condition is detected, execution of Z-Code is halted, a valid machine state is restored and execution continues from the earlier point corresponding to the restored machine state in whatever mode is appropriate. It is assumed that it is within the capability of a processing element to avoid such errors if all of the instructions that are associated with such an error are located within the same level of conditionality in the same segment and are assigned to the same processing element. So in accordance with this invention, recovery from such an error preferably also includes a modification in the scheduling of instructions, so that when new Z-Code is produced as a consequence of the occurrence of an out-of-sequence error, the new Z-Code will not produce the same error when it executes.

Since some limit must be placed on the amount of Z-Code that can be stored, at some point a decision must be made, in a practical embodiment, as to which Z-Code to replace. This is much like the decision faced with cache management and it is handled in the same way. In the preferred embodiment, an LRU (Least Recently Used) algorithm is applied to age out stored Z-Code within each processor element. The set of entry points into established Z-code segments is searched continually during the E-mode as well as at the conclusion of each processing cycle in order to stop the generation of Z-code that already exists. A processing cycle concludes: at the end of the Z-code segment, or following a branch wrong guess during the Z-mode, or following the termination of E-mode.

In the preferred embodiment, a Z-Code segment can be entered at the beginning (i.e., re-execution of an instruction sequence starts with the first instruction of the sequence) or at any number of preassigned entry points within the segment. Entry points can be created by the E-Mode in the following fashion. When an instruction has been declared as an entry point a directory entry within the Z-Code cache is made within every Z-Cache. This entry identifies the entry point and establishes the first instruction within the Z-Code that a given processor element must execute when the Z-Segment is entered. Associated with each entry point is the number of the first common register to be renamed by the set of instructions that conceptually start at the entry point. Two other aspects of the parallelization complete the requirements associated with processing in the parallel mode starting at an entry point. Each processor element maintains a Z-Code register table that identifies the names of the registers within the common register file that were associated with each architected register during the E-Mode processing of a P-Segment. Further, the scheduling of instructions is organized so that no instruction conceptually following an entry point, within the P-Segment, is scheduled prior to any prior to any instruction that conceptually precedes the entry point. With such a scheduling restriction, all instructions within the Z-Code for any processor element that are sequentially encountered following an entry point within each processor element Z-Cache conceptually follow the entry point within the P-Segment. In the Z-Code processing a source register number encountered within an instruction is equal to or greater than the common register number associated with the entry point will be set by some processor element that starts its Z-Code at the entry point. If the source register number, within an instruction, is less than the common register number associated with the entry point then the value of the source register is derived by first identifying the associated architected register using the register correspondence table associated with the entry point and extracting the value of architected register from the system state on entry to the Z-Segment.

In the preferred embodiment, each processing element has a private Z-Cache in which Z-Code for that processing element is stored, but all processing elements access a common memory hierarchy for E-Code and data not stored in a register or the equivalent. The memory hierarchy is equipped with additional controls to assure that asynchronously occurring fetches and stores of operands do not violate architectural rules associated with the setting of values and inspection of values within the memory.

While some assignment schemes implemented in the E-Mode execution are better than others in terms of how efficiently SPURR will be able to execute the instruction stream in Z-Mode, SPURR will function correctly irrespective of the assignment scheme used. A perfectly suitable assignment scheme, for example, might be: 5 sequential instructions assigned to the first processing element, the next 5 sequential instructions assigned to the second processing element, etc. and repeating this assignment sequence again after assigning 5 sequential instructions to the last processing element until all of the instructions in the P-Segment have been assigned. A particular method for making this assignment, but which also has broader utility, is the subject of a separate patent U.S. Pat. No. 5,408,658 entitled "SELF-SCHEDULING PARALLEL COMPUTER SYSTEM AND METHOD".

The detailed embodiment of the SPURR organization is highly similar to the one employed in U.S. Pat. No. 5,347,639 SELF PARALLELIZING COMPUTER SYSTEM AND METHOD herein incorporated by reference in its entirety. The major distinction is that the processor elements all access a common register file and with such a parallel process or target machine many of the details of the referenced prior patent such as: message passing between a processor element that sets a register and the processor element that must use that register, a message handler that moves the message, a register file structure within each processor element that accommodates the messages sent by other processor elements, and a means of assembling the machine state from the plurality of register files is no longer required. The Z-Code generated can be made branch enterable and can utilize the full parallelism available as the individual processor elements can execute instructions out of their original conceptual sequence. This greatly simplifies the scheduling operation that was handled in U.S. Pat. No. 5,408,658 SELF-SCHEDULING PARALLEL COMPUTER SYSTEM AND METHOD herein incorporated by reference in its entirety.

The overall nature of the self-parallelizing processor in terms of the following are essentially the same as those incorporated in the prior self-parallelization approach of U.S. Pat. No. 5,347,639 SELF PARALLELIZING COMPUTER SYSTEM AND METHOD with the exception of the target parallel architecture involves a common register file and that the operation of creating a parallel code in the E-Mode involves register renaming that is incorporated in parallel form of the instruction.

A brief summary of the following operations within the SPURR processor should give an adequate framework for understanding the differences between SPURR and other self-parallelizing processors.

During the E-Mode all Processing Elements will see and decode all instructions within the program segment. The Processing Elements perform asynchronously and independently doing essentially identical work albeit at possibly different times. The result of the decode operations will be to rename the registers that are changed by the instructions and to make the new name of the register available within the local copy of the register correspondence. Each Processor Element, using the instruction, will derive the earliest possible time that the instruction can be decoded, based on the availability of its inputs. This timing uses the availability time for all input registers maintained in the register correspondence table. The Processor Element then computes the schedule time for the instruction based on an occupancy assignment algorithm that will be described below. This occupancy assignment algorithm determines the number of the Processor Element that is assigned the execution of the instruction. The other Processor Elements then continue with the next instruction but the Processor Element that is assigned the instruction will first create the parallel form of the instruction which includes: the renamed registers, the sequence number of the instruction, and the additional information that is required for the correct execution of the parallel code in the Z-Mode. The assigned Processor Element then places the parallelized form of the instruction within its Z-Code cache at a the position, relative to the starting position of the parallel code within the Z-Cache, specified by the scheduled cycle of decode. The assigned Processor Element will then execute the instruction using the parallelized form so as to update the appropriate renamed registers. At the conclusion of the E-Mode each Processor Element will have the portion of the program segment assigned to it in its own Z-Code Cache. The set of instructions will be ordered by their individual scheduling times. These instructions will go directly from the Z-Code cache to the Processor Element associated during the Z-Mode. The instructions can access the registers they require without renaming as the registers have already been renamed during the E-Mode. Any additional information required for the correct execution of the parallel code and the recovery from a branch wrong guess has been incorporated into the information available during the Z-Mode execution of the program. The initiation of the Z-Mode is based on finding an entry in the Z-Code cache directories of all Processor Elements that is the address of the next instruction needed for processing. As all Z-Code cache directories are identical, although the contents of the caches are different for different Processor Elements, all Processor Elements make a common decision as to whether or not the next processing phase of the SPURR processor will be in E-Mode or Z-Mode. The parts of the individual Processor Elements involved in the execution of the parallel code are the same as those parts involved in the execution of instructions within the E-Mode. The difference between E-Mode and Z-Mode for a Processor Element involve the assignment of instructions to Processor Element, the register renaming, and the caching of the parallel form of the instruction, all of which occur in the E-Mode. The parts of the Processor Element that execute the instructions are identical in both Modes.

A block diagram of the SPURR processor organization is shown in FIG. 1. Each Processor Element 100 is capable of decoding instructions using an Instruction Decoder/Scheduler 500, accessing the common Register File 160 via 110 to generate addresses for memory operands and to access register operands. The common register file of the SPURR is comprised of M registers that are directly addressable by all Processor Elements. The first m of these registers are the registers used by instructions in the P-Segment. These are the so-called architected registers. The remaining registers are renamed versions of the architected registers. The Processor Elements operate in two modes, the E-Mode and the Z-Mode. During the Z-Mode the instructions that are processed have already undergone renaming and the registers accessed by an instruction are the registers designated by the instruction. In the E-Mode whenever an instruction causes a register to be modified, the register is renamed to the sequentially next higher register that has not as yet been used. The new name of the register is placed in a register correspondence table 170 and any reference to the architected register name will have that name translated to its renamed value during the E-Mode of processing. The instructions are processed as if they addressed the renamed registers and it is the renamed versions of the instructions that are incorporated into the parallel form of the program that constitutes the Z-Segment. The operands accessed by the instructions are sent to the Execution Units 130 within the Processing Elements, which perform the operation specified by the instruction and put away the results of the executions within the renamed registers. The Processing Elements in SPURR are identical with the exception that each Processing Element has a prespecified Identification Number (1, 2, in a system with n Processing Elements). This Name of a Processor Element is known to the Processor Element and during the E-Mode, for example, it allows the Processing Element to determine if the instruction that it is decoding is assigned to it. To illustrate this point, when an instruction is scheduled on a given cycle the Processor Element that is assigned the instruction is the Processor Element whose number equals the number of instructions, including the just scheduled instruction, that are currently scheduled to be processed on that cycle. Each Processor Element is connected via a Bus 135 to a Memory Hierarchy 140 which supplies data operands on fetch operations, receives store operands on store operations, and is used for instruction fetching during the E-Mode. The actual fetching and storing of operands is done through a set of OSC/PSC Controls 300 which assure that all hazards associated with out-of-sequence memory access operations are detected.

Each Processor Element has its own private Z-Cache 200 which stores annotated instructions for the Z-Mode of operation. Instruction fetching during the Z-Mode uses a dedicated Bus 150 within each Processor Element.

SECTION 2 PRIVATE Z-CACHES

Figure 2A:
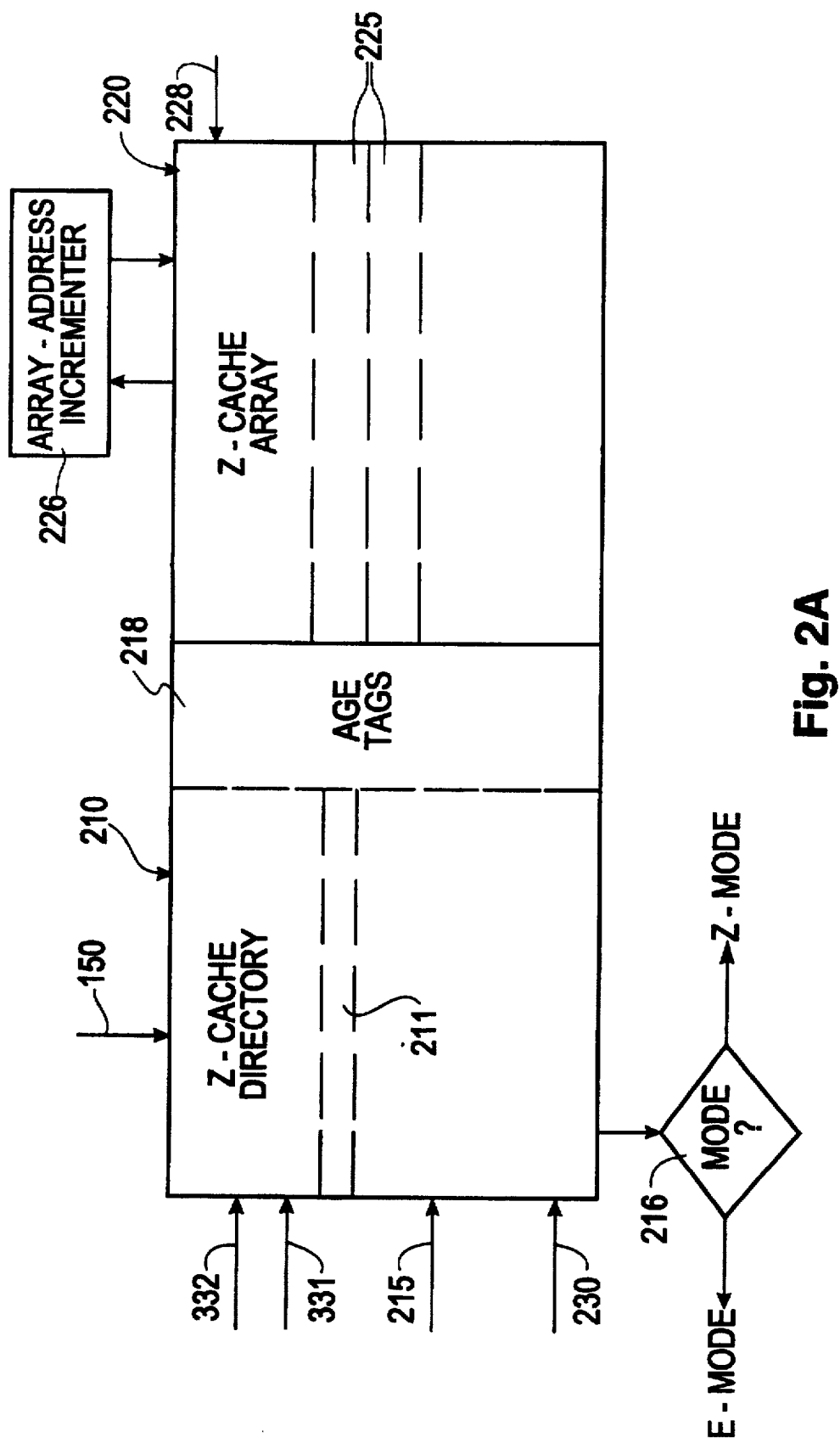
FIG. 2(A) illustrates the structure of the private Z-Cache used by a single processing element in the preferred embodiment.
Figure 2B:
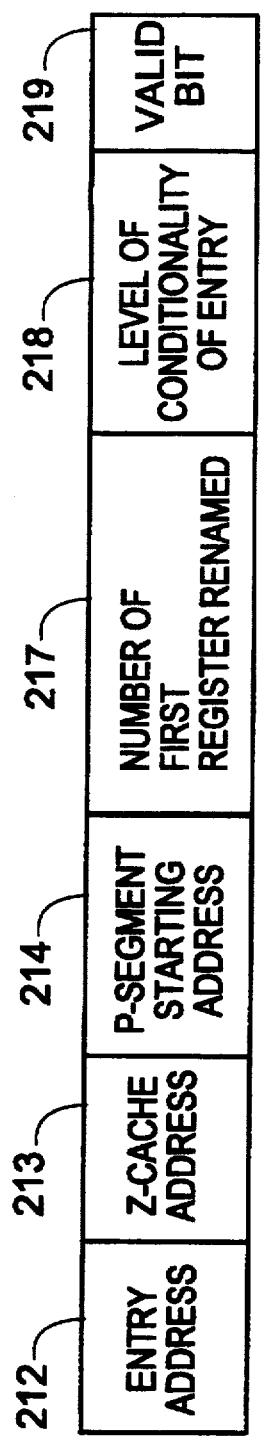
FIG. 2(B) illustrates the format of an Entry in the Directory of a Z-Cache.

The information in this section derives, with essential modifications from U.S. Pat. No. 5,412,784 APPARATUS FOR PARALLELIZING SERIAL INSTRUCTION SEQUENCES AND CREATING ENTRY POINTS INTO PARALLELIZED INSTRUCTION SEQUENCES AT PLACES OTHER THAN BEGINNING OF PARTICULAR PARALLELIZED INSTRUCTION SEQUENCE herein incorporated by reference in its entirety. Instruction fetching during the Z-Mode is done by accessing the Z-Code in a Z-Cache 200 (FIG. 1) that is associated with each Processing Element. The organization of the Z-Cache is illustrated in FIG. 2(A). Z-Cache Directory 210 is used to keep track of the Z-Segments stored in the Z-Cache Array 220. The contents of the Z-Cache 200 represent a prespecified number of Z-Segments, each Z-Segment having a maximum number of Cells 225, each Cell accommodating one Z-Instruction. Each Z-Cache 200 comprises a Directory 210 and an Array 220 of Cells addressed from that Directory. The format of a Z-Cache Directory Entry 211 is shown in FIG. 2(B).

It contains:

Entry Address 212, which is either the starting address of the P-Segment from which this Z-Segment was created or it is an intermediate entry point address within this Z-Segment;

Z-Cache Address 213 of the Cell which contains the first Z-Instruction in that Z-Segment for that Processor Element which is not conceptually later than the instruction whose address was the search argument for the Z-Cache Directory;

P-Segment Starting Address 214 that was used to generate this Z-Segment;

Number of first common register used as a renamed register 217 following this entry point;

Level of Conditionality 218 of the instruction that represents the entry point;

Valid Bit 219.

The Directory invalidation feature using the Valid Bit 219 is used in two situations. Signal Line 331 is used to invalidate all Z-Code in all Processing Elements when a Program Store Compare (PSC) hazard is detected. Signal Line 332 is used to invalidate the current Z-Segment when an Operand Store Compare (OSC) hazard is detected. Both these hazards are described in detail in Section 3.

Instruction fetching (i.e., I-Fetching) during Z-Mode is derived from the Z-Cache. The absence of a match with any Directory Entry Address 212 causes the setting of the Processor Element to the E-Mode via Decision Block 216 and the I-Fetching in E-Mode is derived from the Memory Hierarchy 140 (FIG. 1).

Figure 2C:
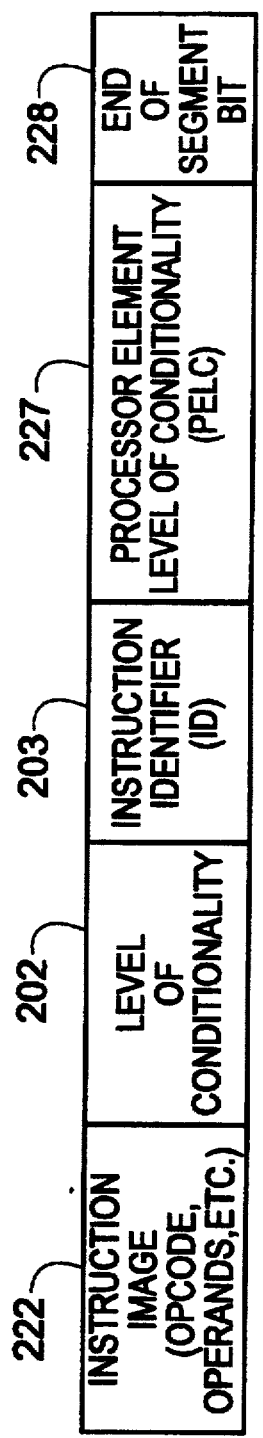
FIG. 2(C) illustrates the format of a Z-Instruction stored in a Cell of a Z-Cache.

The Z-Cache Array 220 contains the Z-Instructions. Z-Instructions are of fixed size and format, which is illustrated in FIG. 2(C). Each Z-Instruction contains the following information:

Instruction Image 222 (Opcode, Operands, Etc.), which is the usual information necessary to execute the instruction. Each register operand specifies one of the M common register in the common register file and will be used directly without any register renaming.

Level Of Conditionality 202, which is used by the Operand Store Compare (OSC) controls within the cache to manage the detection of the OSC hazard and determine when Stores may be released to the Memory Hierarchy, as branches are resolved during the execution of instructions;

An Instruction Identifier 203 which is the instruction sequence number identifies the instruction within the Z-Segment. The Instruction Identifier is used by the OSC controls to identify the OSC hazard when the STORE and FETCH instructions share a level of conditionality;

For each branch instruction encountered it is necessary to flag the instruction that has the highest scheduled cycle time with the Level of Conditionality of the branch instruction. This is done by using the Processor Element Level of Conditionality, PELC, field 227 of the instruction within the Z-Cache.

An End of Z-SEGMENT Bit 228 is associated with the last instruction within each Z-SEGMENT for each Processor Element.

As part of the I-Fetch operation, all the information in the Z-Cache Cell is transferred to the Decoder and other relevant portions of the Processor Element after it has been relativized to the entry point. At the time of the initial match between an address presented at Bus 215 the LC 218 of the matched entry is placed in the LC Relativizer 290.

As each instruction is derived successively from the Z-Cache Array 220, the Level of Conditionality 202 of the Z-Instruction is reduced by the value in LC Relativizer 290, thereby relativizing the level of conditionality of the instruction, its operands, etc. for all future instruction processing. Further the Processor Element Level of Conditionality 227 must also be reduced by the value in the LC relativizer 290 thereby relativizing the Processor Element Level of Conditionality associated with the instruction.

Successive Z-Instructions for each Processor Element occupy consecutive Cells 225 of the Z-Cache Array 220 associated with that Processor Element and an Array-Address Incrementer 226 is used to access that Cell.

The creation of Z-Segments in the E-Mode is sensitive to the limitations of the Z-Cache size and structure, which are arbitrary in principle, but are limited in any implementation. Z-Segments exceeding the capacity of the Z-Cache cannot be created as the E-Mode is terminated and trimmed to the last full Level of Conditionality.

Figure 2D:
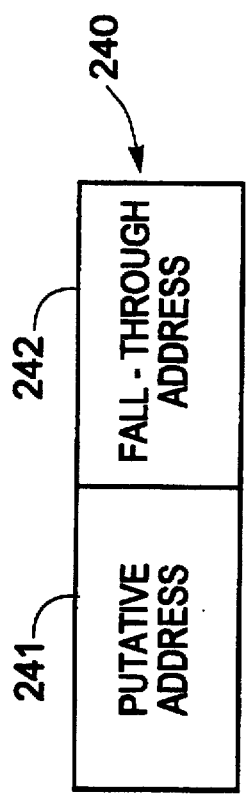
FIG. 2(D) illustrates an Instruction Format Extension for a Z-Cache Cell.

There being no relationship between Memory Hierarchy addresses of instructions and their position in the Z-Cache, some of the Z-Instructions must also have an Instruction Format Extension 240 (FIG. 2(D)) associated with them, which contains Memory Hierarchy addresses when this information will be required. In the case of branch instructions this extension is required. Each conditional branch instruction has the address of the Putative Address 241 that was used to generate the Z-Code, and a Fall-Through Address 242 which is the value of the Program Counter (PC) and points to the next-sequential instruction that follows the branch.

If the branch target is:
- the same as the Putative Address 241, no action need be taken,
- is not the Putative Address 241 because the branch is not taken, then a Branch Wrong Guess (BWG) action is taken with respect to the Fall-Through Address 242,
- if the branch is taken to a target other than the Putative Address 241, that address is generated by the Processor Element at the point of address generation of the branch instruction and the BWG action can be taken with respect to that target.

For unconditional branches, only the Putative Address 241 is used and the value of the Program Counter (PC) can occupy the Fall-Through Address 242. The value of the PC can be used to set the value of registers, when PC-dependent values are needed for such instructions as BAL(R) (Branch and Link (Register)).

The contents of all Z-Cache Directories are the same although the contents of the Z-Instruction Cells in the Z-Cache Array is different in different Processing Elements. The maintenance of multiple identical Z-Cache Directories represents a trade-off between creating greater autonomy within the Processing Elements and sending messages to the Processing Elements when a new Z-Segment is to be initiated.

At the start of the E-Mode, a common Directory Entry is made in all Z-Caches using information supplied by the Processor Element via a write Bus 230. If all Entries in the Directory 210 are valid, then a Least Recently Referenced (LRU) algorithm is used to select the Z-Segment to be replaced (e.g., employing the standard age-tag dating of directory entries using Age Tags 218).

The Cells 225 for the Z-Segment in each Processing Element are updated using the Bus 228. This Bus works in conjunction with the cycle of scheduling associated with the instruction, so that instructions assigned to a Processor Element are stored as Z-Instructions in the order in which they are scheduled which may be out of conceptual sequence with respect to their position within the original P-Segment.

To specify the range of entries in the Z-Cache Directory, which allows for multiple entry points within the same Z-Segment, requires the following:

There is a need to place additional entries into the Z-Cache Directory so that the Z-Code as generated Z-Code can be used but from different starting addresses.

Such entries must have an associated Level of Conditionality LC, derived from the P-Segment as a whole so that the LC of subsequent instructions can be relativized.

The manner in which this can be accomplished is to make the generation of entry points the provide of the E-Mode processing. Either through an identification via an external means of addresses of instructions that are suitable for entry points or by periodically declaring the next instruction an entry point the E-Mode has available to it all the requisite information required by an entry point. As the scheduling of instructions is potentially out-of-conceptual sequence it is necessary to schedule all instructions at or following an entry point after all instructions that conceptually precede the entry point in all Processor Element Z-Caches.

SECTION 3 MONITORING FOR OSC AND PSC

The structural elements of the Operand Store Compare (OSC) Controls and the Program Store Compare (PSC)

Figure 3A:
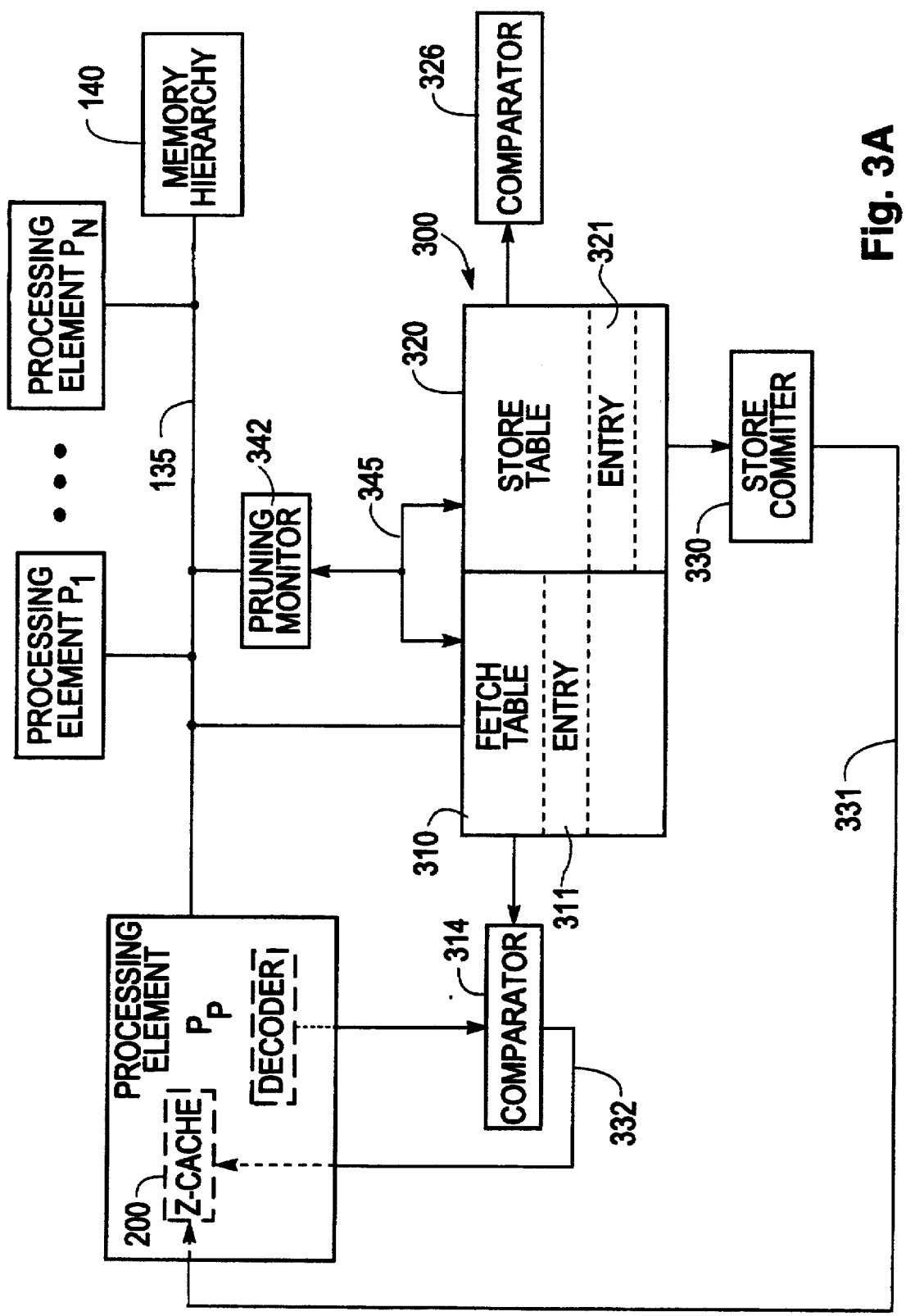
FIG. 3(A) is a block diagram of the OSC/PSC Controls which monitor out-of-sequence hazards in the preferred embodiment.

Controls 300 are illustrated in FIG. 3(A). As each FETCH and STORE is presented to the Memory Hierarchy Interface 145, Controls 300 monitor OSC and PSC and interact with the access. Thus, the placement of Controls 300 can be part of the Memory Hierarchy Interface 145 and can be considered as an adjunct to it. Each of these Controls 300 is now described separately.

Operand Store Compare (OSC)

The architecture of a processor usually requires that a FETCH from a memory location must see the value stored in that location by the latest STORE preceding that FETCH in the conceptual sequence. This is called OSC and a violation of this is known as an OSC hazard. In SPURR, since the FETCH and the STORE may be performed asynchronously on different Processing Elements, they need to be monitored to determine whether or not a possible OSC hazard has occurred.

For the remainder of this Section 3, the term FETCH will denote an operand fetch and instruction fetching will be specifically indicated as such whenever the intent is to consider it.

An OSC hazard is said to be intra-Processing Element, if the corresponding FETCH and STORE operations are executed on the same Processor Element. As instructions are not maintained in conceptual sequence within a Processor Element, the monitoring of the intra-Processor Element OSC is required. The Instruction Identifier 203 when associated with the FETCH and STORE operation allows the OSC controls to determine whether an OSC hazard has been encountered.

An OSC hazard is said to be inter-Processor-Element, if the corresponding FETCH and STORE operations are executed on different Processor Elements. Once the scheduler allows for out-of-sequence instruction scheduling within a processor element there is no meaningful distinction between intra-Processor-Element and inter-Processor-Element as regards the monitoring of the OSC hazard. The problem of monitoring OSC involves three factors:

Stores must be committed on a timely basis as it is necessary to avoid a delay associated with committing stores at the end of a Z-Segment. Pruning of the Fetch and Store tables can be accomplished when the hazard associated with OSC has become irrelevant for the Fetches and Stores within the Table. This is done by assuring that all relevant activity, all fetches and stores that could cause the OSC hazard have already been processed. The use of the Processor Element Level of Conditionality assures that all activity, below that level of conditionality, that is scheduled for a given Processor Element has already been issued. This replaces the conventional level of conditionality associated with individual fetches and stores as with out-of-sequence instruction scheduling, within a Processor Element, the level of conditionality of instructions is no longer monotonic within the sequence of instructions scheduled for a processor element.

As the Z-Segment is executing and fetches and stores are sent to the memory hierarchy an update of the Processor Element Level of Conditional for each Processor Element occurs. A minimum value of the Processor Element Level of Conditionality taken across Processor Elements can be compares to the current level of conditionality derived from the resolution of branches within the Z-Segment. The minimum of these two quantities determines the level of conditionality of all fetches and stores within the fetch/store tables that can be pruned. The pruning of a fetch removes the fetch and the pruning of a store commits the store to the memory hierarchy.

The level of conditionality is common to all instructions within a branch group. This level is shared by the branch instruction which terminates the branch group. When a branch wrong guess is detected then the level of conditionality of the conceptually first branch wrong guess delimits the store activity that must be committed to the memory hierarchy. That is, all stores with a level of conditionality that is less than or equal to the level of conditionality of the first branch wrong guess within the Z-Segment must be committed to the memory hierarchy and the other stores must not be committed. The stores must carry their level level of conditionality properly relativized to the entry point of the Z-Segment.

Hence, the monitoring of both such hazards is done using the following three attributes of an instruction:

1. The Level of Conditionality (202)—FIG. 3(B) and (3C)

The properly relativized, based on entry point to the Z-Segment, Level of Conditionality of any instruction, including branch instructions, is the number of branch instructions that precede the instruction in the P-Segment and conceptually follow the entry point. All instructions within a branch group including the terminal branch of the group share the same level of conditionality. The initial value of the level of conditionality of instructions within the Z-Segment unrelativized is zero. All instructions within the same branch group as the entry point have a relativized level of conditionality of zero.

2. Processor Element Level of Conditionality (LC) 302—FIG. 3(B) and (C) The LC is derived from the Processor Element Level of Conditionality (PELC) that is maintained within each Processor Element by monitoring field 227 of the instructions that are processed. This filed is relativized based on the level of conditionality of the entry point which is maintained in the LC relativizer 290. The unrelativized initial value is zero and when relativized it is offset by the level of conditionality of the entry point. All values for the PELC for all instructions that conceptually follow the entry point have a value at least equal to the level of conditionality of the entry point as the initial setting of the PELC is the level of conditionality of subsequently encountered branch instructions. When an instruction has a non-zero relativized PELC in field 227 all subsequent FETCH and STORE operations are given the current value (302) to annotate their memory access operations.

3. Instruction Identifier (ID) 203—FIG. 3(B)

The ID is the sequence number of the instruction in the P-Segment.

In E-Mode, all Processing Elements see all instructions in sequence, so that the LC (202) and the ID (203) is known in a natural way. As instructions are processed in sequence the setting of the PELC (227) when a branch instruction is encountered involves setting (227) of the latest scheduled instruction for each Processor element equal to the level of conditionality of the branch. As Z-Code is executed, the LC (202), the ID (203) of each instruction is available from the Z-Instruction, and the current PELC (227) for each Processor Element is available from the last instruction processed within the Z-Mode for which it was set. These can be used to annotate all FETCH (FIG. 3B) and STORE (FIG. 3(C)) with the requisite information. Although the use of the PELC as (302) is monotonic it can skip intermediate values and does not give the proper granularity to determine which store operations should be committed when a branch wrong guess occurs.

The OSC Controls maintain two tables: a Fetch Table 310 (FIG. 3(A)) with a Comparator 314 and a Store Table 320 with a Comparator 326.

Figure 3B:
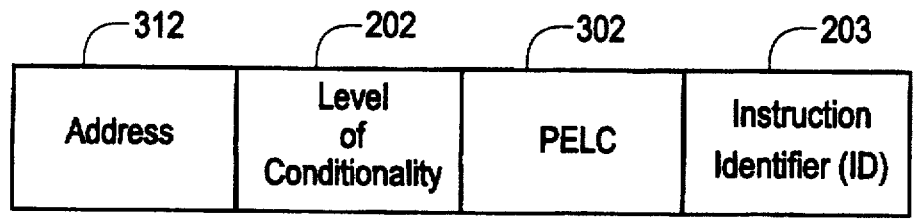
FIG. 3(B) illustrates the format of a Fetch Table Entry in the OSC/PSC Controls.

A Fetch Table Entry 311 is illustrated in FIG. 3(B) and has the form (Address, LC, PELC, ID). Address 312 is the full address of the FETCH and its extent in bytes. The LC 202, the ID 203 of the FETCH instruction that generated the FETCH, and the PELC which is the currently last PELC processed by the Processor Element, are also included in the Fetch Table Entry 311. FETCHES that span multiple Double Words (DW) create multiple entries in the Fetch Table.

Figure 3C:
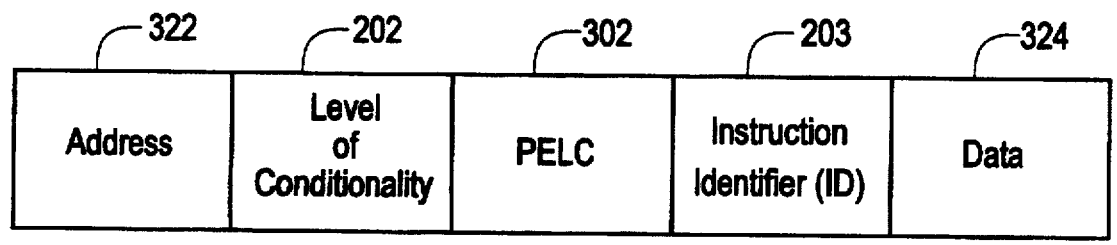
FIG. 3(C) illustrates the format of a Store Table Entry in the OSC/PSC Controls.

A Store Table Entry 321 is illustrated in FIG. 3(C) and has the form (Address, LC, PELC, ID, Data). Address 322 is the full address of the STORE and its extent in bytes. The LC 202, the ID 203, and the PELC are derived from the STORE instruction and information maintained by the Processor Element. Data 324 is the full DW to be stored into the Memory Hierarchy, as part of the STORE instruction. The Data 324 is derived by merging the result of the STORE with the other bytes within the DW as taken from the Memory Hierarchy. Should a STORE cross a DW boundary, two entries in the Store Table are made, one for each DW affected. Store instructions which generate multiple DWs will be treated similarly. The merge operation is done without the Store being committed to the memory hierarchy.

A FETCH is executed as follows:
1. By matching on the Address field, Entries are selected from the Store Table that have the same Address as the FETCH instruction and have a smaller ID than that of the FETCH instruction.
2. If a match occurs, the FETCH returns the Data 324, to the requesting Processor Element, from the matched Store Table Entry having the largest current ID that is less than the ID of the FETCH.
3. If there is no match on any STORE entry with a lower ID, then the value for the FETCH is obtained from the Memory Hierarchy 140.
4. An Entry is made into the Fetch Table for this FETCH instruction. The Processor Element FETCH/STORE LC Table 344 is updated, using the PELC (302) field of fetch operation, if it changes.

A STORE is executed as follows:
1. By matching on the Address field, Entries are selected from the Fetch Table that have the same Address as the STORE instruction and have a larger ID than that of the STORE instruction.
2. If any such entry exists, an OSC hazard is raised.
3. An entry is made into the Store Table for this STORE instruction. The Processor Element FETCH/STORE LC Table 344 is updated, if it changes.

Figure 3D:
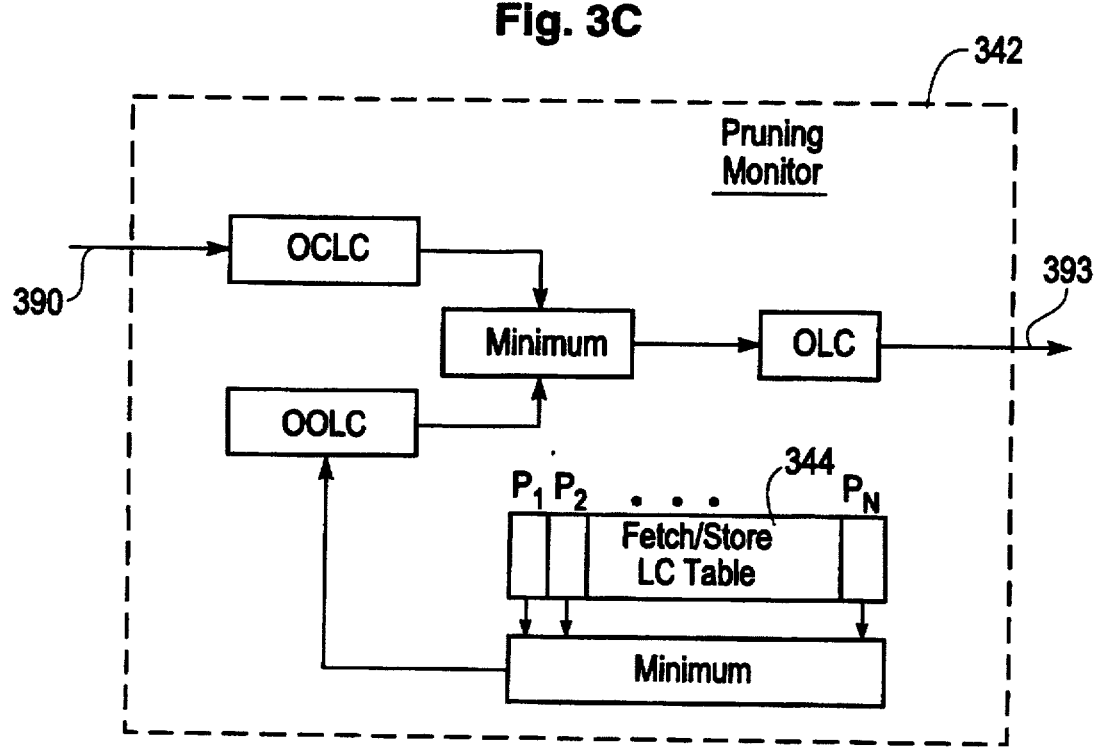
FIG. 3(D) illustrates the Pruning Monitor in the OSC/PSC Controls.

The entries in the above two tables are pruned using a Pruning Monitor 342, illustrated in detail in FIG. 3(D), which maintains 3 quantities:

1. Overall Certified Level of Conditionality (OCLC) 341:
   The branch resolution mechanism within each Processor Element communicates to the Pruning Monitor via Bus 390 the resolution of each branch instruction in the Z-Code. At any given time, the OCLC is the largest LC, such that all branches at lower levels have been resolved correctly. When a branch at the LC which is one more than the OCLC is resolved as a BWG, the stores at the LC of the branch or at lower LC are pruned and the OSC controls are cleared and a branch wrong guess at this level of LC is communicated to all Processing Elements. The action of the Processing Elements upon receiving this signal is described in Section 5 under Z-Code Processing.
2. Overall Operand Level of Conditionality (OOLC) 343:
   Whenever a memory FETCH or STORE instruction is executed, its PELC is used to update the FETCH/STORE LC Table 344 entry for that Processor Element and a value that is the minimum of these entries across all Processing Elements is the OOLC 342. Whenever a Processor Element executes the final instruction of its Z-Code as indicated by the End of Z-Segment Bit 228 (FIG. 2(C)), the Processor Element will send an End of Z-Code signal as a pseudo-FETCH. The sole purpose of this signal is to eliminate the PELC for that Processor Element from within the FETCH/STORE LC Table from participating in the minimization calculation to determine the OOLC.
3. Overall Level of Conditionality (OLC) 340:
   OLC is the minimum of OOLC and OCLC.

The implication is that each Processor Element has executed all instructions at levels lower than OLC. Furthermore, all branches at levels lower than OLC have also been resolved. Hence, any FETCH/STORE entries with LC less than or equal to the OLC can be pruned. Whenever OLC changes, the Pruning Monitor takes the following actions via Bus 345:
1. Remove all Entries from the Fetch Table with LC less than or equal to the OLC.
2. Select all Entries from the Store Table with LC less than or equal to the OLC.
3. If none of the selected Entries raises a PSC (as described later), then scan the above selected Entries in increasing order of their ID and as each Entry is scanned, commit the STORE and delete the Entry from the Store Table.

When an OSC hazard is raised, the Decoder 500 is presented with the Instruction Identifiers of the instructions which created the hazard. The hazard is cleared by simulating a Branch Wrong Guess at the preceding LC. A hazard raised at conditionality level zero restores the machine state that corresponds to the start of the Program Segment (P-Segment). A hazard raised at some non-zero LC, restores the machine state that corresponds to the branch instruction at the preceding LC. In either case, the current Z-Code is invalidated in all Z-Caches using Bus 332 and E-Mode is entered.

To avoid the hazard within a Level of Conditionality, a FETCH and a STORE whose instruction formats suggest that they will access the same memory location (for example if their operands use the same base and index registers and have the same displacements), should be scheduled on the same Processor Element and scheduled in their conceptual sequence.

Program Store Compare (PSC)

Certain architectures support self-modifying programs by allowing "stores into the instruction stream." For such architectures SPURR is required to determine if the Z-Code generated is valid for subsequent re-execution by monitoring for the possibility that storing may have occurred into the I-Stream for the code used to generate this Z-Segment or an active Z-Segment may itself STORE into its own I-Stream. The name given this hazard is PSC.

The Memory Hierarchy has a Cache and an associated Directory that contains an Instruction Reference Bit that specifies that the line was used as a source of instruction fetching in the E-Mode. If such a line leaves the cache then PSC is raised and all Z-Code is invalidated using Bus 331 (illustrated also in FIG. 2(A)).

If the Store Commiter 330 which commits STORES to the Memory Hierarchy based on the pruning of the Store Table 320 determines that a STORE will be made into a line with the Instruction Reference Bit set on, it raises the PSC hazard and cancels the commitment of all Stores at the LC where the PSC hazard was raised. The machine state at the prior LC is restored and the PSC hazard is cleared in the same manner as an OSC hazard.

SECTION 4 HANDLING BRANCHES AND COMMON REGISTER FILE

In pipelined architectures, several instructions could be partially executed before a branch decision is determined. Often this is done by guessing the branch decision using some criteria. When a branch is guessed wrong, the corrupted state of the processor must be restored to the state the machine was in right after the branch.

Processor architectures differ in what constitutes their machine state. Generally the state comprises the contents of addressable registers.

SPURR complicates the state restoration process in two ways. First, a BWG in E-Mode results in discarding the Z-Code built since the wrongly guessed branch instruction and re-adjustment of instruction IDs for the correct sequence of instructions following the branch. Second, the register state in Z-Mode is distributed across the common register file and must be consolidated within the space allocated to the architected registers.

Furthermore, SPURR involves transitions between E-Mode and Z-Mode even without BWG. The actions taken during such transitions are identical to those during a BWG. The manner of collecting the register state of the processor following the completion of an E-Mode, the completion of a Z-Mode, or following a BWG (branch wrong guess) is based on the initial conditions vis-a-vis registers that is expected by each processing cycle of the SPURR processor. These initial conditions involve the correctness of the architected registers which comprise the first m registers of the common register file and the invalid status for the remaining M - m registers. To accomplish this, a recovery of the values of the architected registers from the common register file is required. The Register Correspondence Table (170) identifies the common register that is associated with each architected register. During the E-Mode, the status of the Register Correspondence Table is determined after each branch instruction and at the end of the E-Mode processing. This information is cached and indexed by starting address of the Z-Segment and the Level of Conditionality of the Branch Instruction.

When a Z-Segment completes, the Register Correspondence Table associated with the completed Z-Segment is retrieved and is used to initialize the Common Register File with the proper values. No special provision has to be made for recovery of the register state following a branch entry into a Z-Segment. If the proper unrelativized level of conditionality is used to access the the cached Register Correspondence Table, associated with the BWG, then the common registers identified will be correct if the registers are valid. If a register is valid then the register was set within the Z-Code segment and the value must be recovered and placed in the proper architected register. The fact that it was set indicates that the setting instruction followed the entry point into the Z-Segment. If a register identified in the cached Register Correspondence Table is invalid it means that the register was not set by an instruction that follows the entry point and the value of the architected register, on entry, is the proper value to pass over to the next processing segment. Further, along with the set of Register Correspondence Tables that is cached in the Register Correspondence Table Cache (180) and associated with branches another set of register correspondence tables are associated with entry points. These are called the Register Correspondence Table for Entry points (190), RCTE, which are associated with the Z-Code entry points and developed by the E-Mode when entry points are declared. These two caches can be easily combined if the entry point register correspondence table is used to interface between the Processor Elements and a common register file for accesses to registers whose number is below the first renamed register following an entry point. That is, if each Processor Element flags those registers that require the retranslation using an RCTE, then that information can be kept and associated with the common register file rather than be available locally to all processor elements.

When a branch entry to a existing Z-Segment is performed, the Register Correspondence Table for Entry Points is retrieved from its cache (190) and each Processor Element in accessing the common register files for a register whose number is less than the number of the first common register used as a renamed register (217), that is part of the entry point information (FIG. 2(B)), can use the correspondence table associated with the entry point to determine the architected register whose value is should be returned as a response to this access. The reason this works is that all instructions with the Z-Code, for all Processor Elements that correspond to instructions that conceptually follow the entry point within the sequential code, reference registers that are either (1) set following the entry point or (2) are the last copy of the register set prior to the entry point. In the former case the source register number is at least as large as that of the first register set following the entry point and in the latter case the register used is one of the registers associated with the register correspondence table associated with the entry point. If within the Z-Code for any Processor Element, an instruction following the entry point in the Z-Code conceptually precedes the entry point then it can be ignored by some mechanism within the Z-Mode processing. In the current implementation this can not occur as the E-Mode schedules, within the Z-Code, all instructions conceptually prior to the entry point prior to all instructions that are conceptually after the entry point. This is described in Section 5. In this implementation, the entry point within each Z-Code separates the instructions that are conceptually prior to the entry point from instructions that conceptually follow the entry point. If the Z-Code included instruction sequence numbers and the sequence number of the entry point was made available within the Z-Cache directory the conceptually earlier instructions could be identified and ignored.

SECTION 5 ASSIGNMENT OF INSTRUCTIONS TO PROCESSING ELEMENTS IN E-MODE AND INSTRUCTION PROCESSING

The details concerning architectural over-rides to the normal instruction scheduling that might be required following the occurrence of an OSC and as well as the manner in which the E-Mode can identify and recover from a branch wrong guess in pipelined processors are completely covered in Section 7, Section 8, and Section 9, of U.S. Pat. No. 5,347,639 SELF PARALLELIZING COMPUTER SYSTEM AND METHOD herein incorporated by reference in its entirety. These self-same approaches can be used in a SPURR environment taking into consideration the differences that exist between SPURR and the MSIS processor described in this referenced patent. The major differences between The MSIS processor and the embodiment of the SPURR processor has already been discussed and the specifics of the scheduling operation and the instruction processing within SPURR will now be detailed.

Figure 4A:
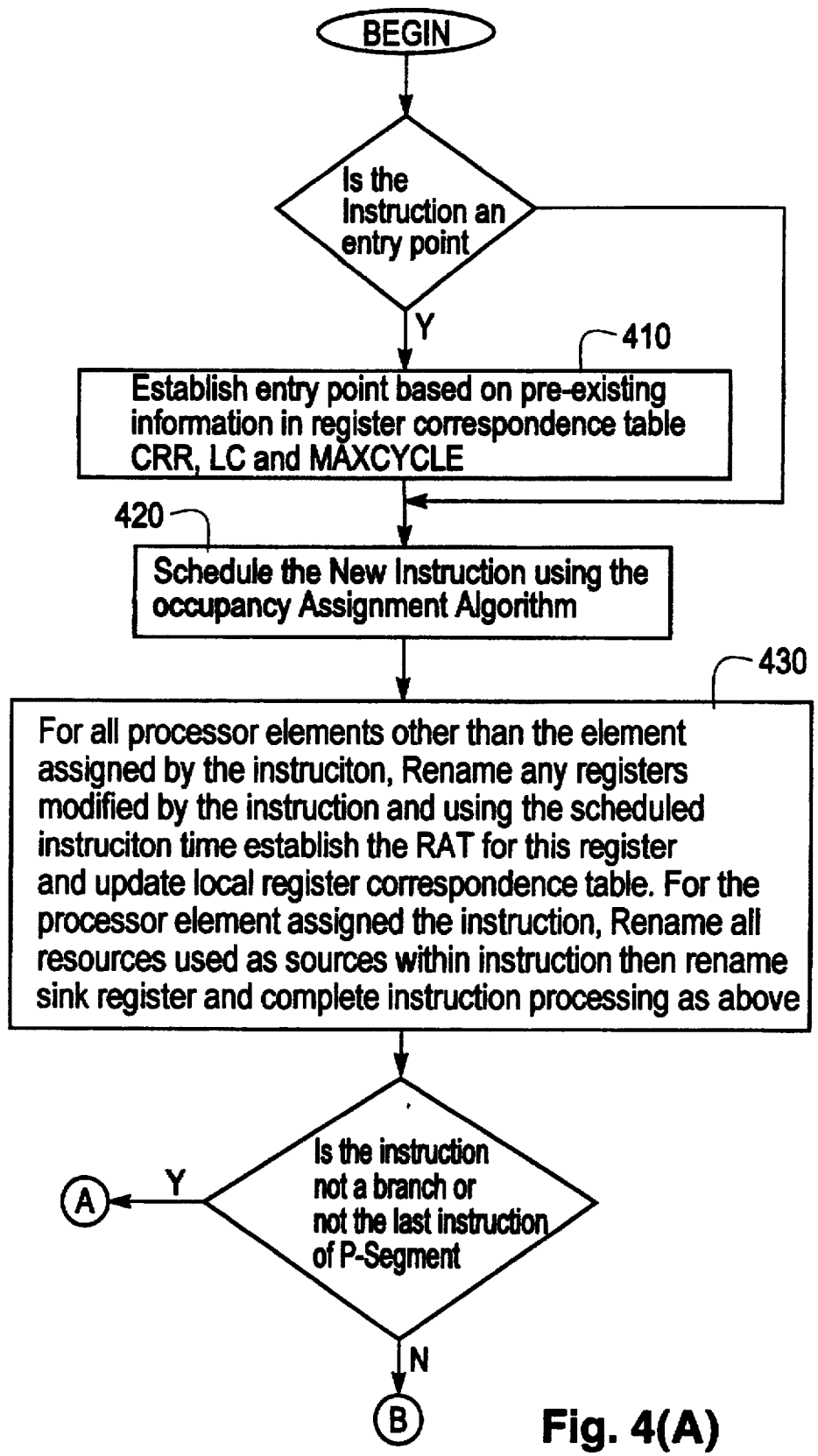
FIGS. 4(A) AND 4(B) illustrate the sequence of operations in the E-mode.
Figure 4B:
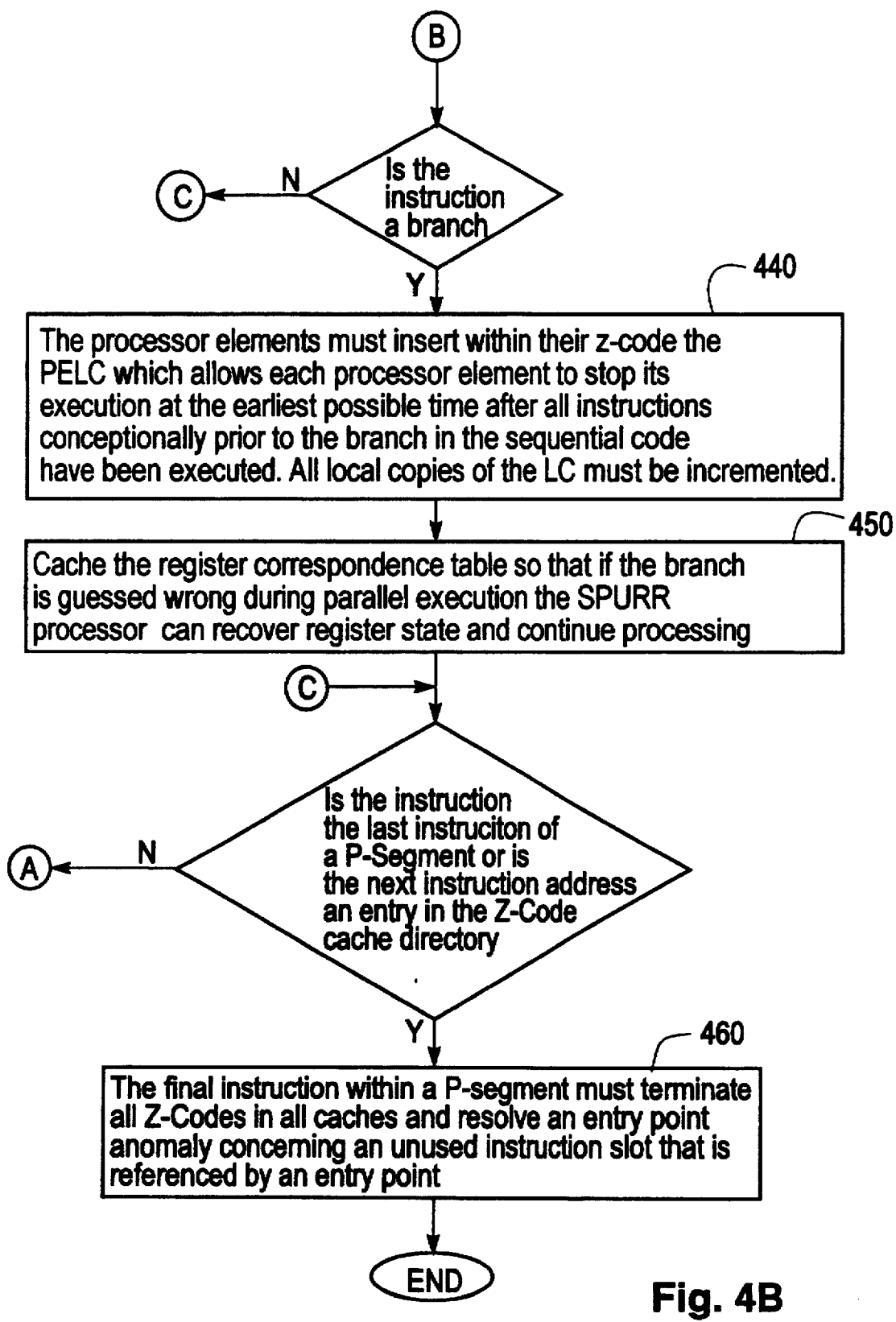

The operations within the E-Mode can be summarized broadly in terms of the following actions that comprise the functions that must be accomplished within the E-Mode:
Register Renaming Instruction Scheduling
Branch Processing for State Recovery—Register Correspondence Table Cache
Branch Processing for Establishing PELC
Handling of Entry Point Establishment
Handling the Final P-Segment Instruction/Terminating the E-Mode The sequence of these operations within the E-Mode is shown in FIGS. 4(A) and (B) and is slightly different from the order shown above. The reason for this is that certain of the functions within the E-Mode such as entry point establishment and scheduling of instructions depend totally on the state of the local information maintained within each processor element at the end of the processing of the prior instruction. Certain other functions within the E-Mode depend on information generated during the processing of the instruction. One key to understanding the sequence of operations in the E-Mode is to understand that all Processor Elements perform an identical set of operations on the sequence of instructions that form the P-Segment. The instructions from the P-Segment are seen in their original conceptual order by each Processor Element while performing identical operations on all instructions. The results of all actions by each Processor Element will be the same as they are dependent only on the sequence in which the instructions are presented, and this sequence is maintained even when the timing of operations may be different. The only difference between the actions of Processor Elements being that when an instruction is determined to be scheduled for a given Processor Element, that Processor Element must create the Z-Code version of the instruction, execute the instruction by updating the affected registers, and place it within its Z-Code cache. The operations within each Processor Element may be done asynchronously but the lack of synchronism between Processor Elements has no effect. In an alternate embodiment it is possible for one Processor Element to perform all the operations within the E-Mode. This would require a means for distributed the Z-Code amongst the Processor Elements. This distribution is avoided by allowing the E-Mode processing to be done by all Processor Elements. Finally, certain E-Mode operations need be done only once per P-Segment. This includes the caching of the Register Correspondence Table at the points where branch instructions are processed and the caching of Register Correspondence Table for Entry Points. Such operations are preferably performed by only one Processor Element, for example Processor Element 1.

As shown in FIGS. 4(A) and (B), the sequence of operations within the E-Mode Processing of instructions includes:
1. Handling of Entry Point Establishment (FIG. 4(A), STEP 410)
2. Instruction Scheduling (FIG. 4(A), STEP 420)
3. Register Renaming (FIG. 4(A), STEP 430)
4. Branch Processing for State Recovery—Register Correspondence Table Cache (FIG. 4(B), STEP 440)
5. Branch Processing for Establishing PELC (FIG. 4(B), STEP 450)
6. Handling the Final P-Segment Instruction (FIG. 4(B), STEP 460)/Terminating C-Mode The following terms are used to describe aspects of a Processor Element that is used in one or more of these functions:

Current Register Rename CRR

This quantity is maintained and incremented during the E-Mode processing of a program segment within each Processor Element. Every instruction which modifies a register has the register renamed to the current value of the CRR and the value of the CRR is immediately incremented before the next rename activity.

Level of Conditionality LC

Each Processor Element maintains the level of conditionality of the next instruction. The Level of Conditionality is the number of branch instructions encountered in the program segment and is incremented following the decode of every branch instruction. The branch instruction shares the level of conditionality with the instructions that precede the branch if they themselves are not branch instructions.

Cycle Occupancy Vector COV

Each Processor Element maintains a vector of arbitrary length whose elements contains a number between zero and n the number of Processor Elements. The COV is used by the scheduler to determine the Processor Element that is assigned to a given instruction and the cycle on which that Processor Element will decode the instruction in Z-Mode.

Register Availability Time RAT

Each Processor Element maintains a table of availability times for the architected registers within this table. Every instruction which modifies a register causes the availability time to be recomputed. The register availability time is the decode time of the register modifying instruction plus any latency associated with memory access or execution time within the parallel mode of operation.

Instruction ID or sequence number

Each Processor Element maintains a running count of instructions that it has processed from the program segment. The count starts at one and is incremented locally following each instruction processed in E-Mode.

Entry Point

An entry point within the Z-Code is a set of Z-cache addresses, one per Processor Element, that are concurrently associated with a fixed instruction address maintained within the Z-Cache directory of each Processor Element. When such instruction address is found, the mode of the Processor Element is set to Z-Mode and each Processor Element begins to access its own Z-Cache for the instructions that it is to process. The start of a Z-Segment is a trivial entry point. A non-trivial entry point will also include within the directory entry the level of conditionality of the instruction selected as the entry point and the number of the first common register set by any instruction that conceptually follows the entry point.

Section 5.1 Handling of Entry Point Establishment (STEP 410)

In order to establish an entry point within an existing Z-Segment, the E-Mode must be able to identify the address of the instruction that is to be the entry point. There are several means through which this can be accomplished. One means is to establish entry points on a secondary parallelization after gathering information concerning the addresses shared by program segments that originate from different addresses. Once this information is gathered a reparallelization of a program segment can create entry points from these shared addresses. Another means is periodically (i.e., every fixed number of instructions with a P-Segment) to declare the next instruction an entry point.

Once established, the entry point must be placed in the Z-Code Cache directory of each Processor Element along with the following information:

the address of the first Z-Code instruction that will be derived from each Processor Element Z-Cache when this entry point is used;

a pointer to the copy of the register correspondence table maintained in the Register Correspondence Table for Entry points cache (190);

the current value of the CRR, which identifies the Common Register that the code following this entry point will rename; and the LC currently available within the Processor Element.

The Register Correspondence Table associated with this entry point is the Table existing prior to the decode of the instruction that is declared an entry point. The Register Correspondence Table associated with the entry point is cached by each Processor Element and will be used when the entry point is exploited by the parallelized execution of the program segment. In addition, each Processor Element maintains the maximum cycle that the Processor Element has employed in scheduling an instruction, MAXCYCLE. The value of MAXCYCLE+1 at the point where the entry point is declared for each Processor Element represents the first cycle of execution within a Process Element following the entry point. In the unlikely event that the final instruction of the P-Segment is encountered before any instruction is scheduled into this cycle the value of MAXCYCLE+1 is placed in the Processor Element last used ENTRY POINT CYCLE, EPC. The EPC will be used by the final P-Segment instruction handler routine within the E-Mode to make the necessary adjustment.

Although the code scheduled by the Occupancy Assignment Algorithm (step 420) is out-of-conceptual-sequence within Processor Element, the schedule of instructions for each Processor Element that follows an entry point must follow all instructions assigned to a Processor Element that conceptual precedes the entry point. This is accomplished by adjusting the Cycle Occupancy Vector, COV, within each Processor Element when an entry point is declared. The sole requirement is that no instruction following the entry point, that will be assigned to Processor Element k, say, can be assigned to a cycle less than the MAXCYCLE of Processor Element k, MAXCYCLE (k), determined at the entry point. The process of forcing the COV to implement this requirement is to adjust the value within the COV for all cycle positions less than MAXCYCLE (k) to be at least k for all values of k. This is equivalent to making COV when indexed over the cycles to be monotonic non-increasing in value. This can be done by direct observation on the COV using the value of the largest cycle schedule across all Processor Elements, MAXMAXCYCLE, and proceeding backwards along the COV. For each cycle position within COV that is less than MAXMAXCYCLE, the value of COV is set to be the maximum of the cycle value within the COV element and the value of COV element for the next higher cycle position. This procedure terminates at the first position of the COV or when the value to be inserted in the COV element equals n, the number of Processor Elements within the SPURR. When this occurs all prior positions in the COV are set equal to n.

SECTION 5.2 Instruction Scheduling (STEP 420)

Each Processor Element contains a Cycle Occupancy Vector, COV, that records the number of instructions that have been scheduled for each cycle up to the point of the current instruction being processed. Whenever a register is renamed and the cycle of decode of the instruction that causes the register modification to occur is determined, a Register Availability Time, RAT, for this register is set in the local copy of the Register Correspondence Table which records the rename of the register. A more detailed description of the register renaming operation is described below in Section 5.3.

At the outset of an E-Mode processing all architected registers are assumed available and the time of availability of a the architected registers is assumed to be zero. The availability time for a newly changed register is the decode time for the instruction that creates the new value plus the execution time and any memory access delay associated with the instruction. The memory access delay for operands required by instruction is a fixed quantity which we shall consider to be one cycle. The decode time of the instruction must exceed by one cycle the RAT of all the decode inputs of the instruction and is then subject to occupancy availability restrictions as defined by the Occupancy Assignment Algorithm (OAA) described below. The 1+maximum of all the RAT that are input to a decode of an instruction is called the min-slot time of the instruction.

An Assignment Algorithm is a rule that determines the decode time of each instruction within a P-SEGMENT and assigns that instruction to a decode time slot and Processor Element. Typically instructions are examined, their registers renamed, and assigned in conceptual sequence and are scheduled subsequent to the RAT of their inputs as follows:

1. Each time-slot within the COV is associated with the number of instructions that have been assigned to that time-slot, the so-called OCCUPANCY of the time-slot.
2. The time-slot of an instruction is computed based on the contents of the RAT that relate to the registers used by the instruction. This time slot is called the min-slot time of the instruction.

If the value of the COV for the min-slot time is less than n, the number of Processor Elements within the SPURR processor, then the SELECTED time-slot becomes the min-slot time.

If the value of the COV for the min-slot time is n, the number of Processor Elements within the SPURR processor, then the instruction is assigned to the first later time-slot whose COV entry is less than n and this become the SELECTED time slot.
3. The OCCUPANCY of the SELECTED time slot is incremented by 1 and the instruction is assigned to the Processor Element whose number equals the value now in the COV for the SELECTED time slot.
4. The decode time equals the SELECTED time and a computation of the RAT for the result of the execution of the instruction is used to update the RAT field within the Register Correspondence Table.
5. Each Processor Element maintains the highest numbered cycle, MAXCYCLE, on which one of its assigned instructions is scheduled. If the SELECTED time slot exceeds MAXCYCLE for the Processor Element that is assigned the instruction, then the current value of MAXCYCLE for the assigned Processor Element is updated to equal SELECTED time.
6. Each Processor Element maintains the highest numbered cycle, MAXMAXCYLE, on which any instruction has been scheduled. If the SELECTED time slot exceeds MAXMAXCYCLE then the current value of MAXMAXCYLE is updates to the value of the SELECTED time.

The assignment created in this way determines the Processor Element that will execute the instruction and the decode time of this instruction. The value of the decode time of the instruction will be used in SECTION 4.3 to compute the RAT of the register, if any, that the instruction modifies.

SECTION 5.3 Register Renaming (STEP 430)

In processing instructions within the E-Mode it is necessary that a register renaming operation occur whenever an instruction sets a new value for an architected register. Registers within SPURR are generalized to encompass anything that one instruction creates that another instruction could depend on and therefore also has to do with the setting of condition codes. In an architecture which employs condition code setting instructions the condition code is represented by an architected register and is therefor subject to renaming.

Each Processor Element records in the CRR the next register within the register file that is available for renaming. At this point in the instruction processing, the instruction has already been scheduled to a Processor Element and its decode time has been determined. To avoid confusion for instructions that modify a register also used as input to the instruction the processing of instructions by Processor Elements differ if the instruction is scheduled on a given Processor Element or not. If the instruction is scheduled on Processor Element α, then Processor Element α within the E-Mode will perform the following operations:

The Processor Element will use the Register Correspondence Table to translate all the instruction source registers to their renamed values.

Processor Element α will consult its CRR to rename the sink register of the instruction and increment the CRR.

Processor Element α will execute the instruction and set the value of the renamed register in the common register file.

Processor Element α will create the Z-Code version of the instruction 222 (see FIG. 2C) and place the instruction in its own Z-Code cache at the address commensurate with cycle on which the instruction was scheduled.

Processor Element α will then complete the processing performed by all other processors following their renaming of the sink register of the instruction.

If the Processor Element is not Processor Element α and the instruction modifies the value of a register then:

the Processor Element will rename the sink register of the instruction using the value within CRR and increment the value in CRR.

All Processor Elements will then do the following for each instruction whose instruction whose execution will potentially change the value of a register:

The results of this renaming are posted in the current copy of the Register Correspondence Table maintained by each Processor Element.

Using the scheduled decode time of the instruction as determined in Section 4.2, the RAT for the register modified by the instruction is determined by adding to the decode, the latencies implicit in the instruction memory access and execution. This allows the RAT to be available for the processing of the next instruction.

If the instruction processed is not a branch or not a P-Segment ending instruction Section 4.4, 4.5, and 4.6 can be skipped and the next instruction is processed by Section 4.1 of the E-Mode Processing.

SECTION 5.4 Branch Processing for State Recovery—Register Correspondence Table Cache (STEP 440)

During the E-Mode, when Processor Element 1 encounters a branch instruction, irrespective of which Processor Element is assigned the decode and execution of the instruction, it must save the contents of its Register Correspondence Table at the conclusion of the renaming operation for the instruction so that the SPURR processor can effect a state recovery. The information associated with the local Register Correspondence Table that associates common registers with their architectural counterparts that they rename at this point of instruction processing must be cached in the Register Correspondence Table for Branches (180) and can be retrieved from this cache using the the starting address of the P-Segment and the level of conditionality of the branch. If the P-Segment is branch entered the level of conditionality used in the retrieval is relativized to the level of conditionality of the entry point as the manner of counting and verifying branches within the code has been relativized using the level of conditionality of the entry point. The manner in which the information retrieved from the Register Correspondence Table is used to establish the initial register state for the resumption of processing following the completion of a parallel processing phase for SPURR or following the occurrence of a branch wrong guess has already been described in Section 4.

SECTION 5.5 Branch Processing for Establishing PELC (STEP 450)

When a branch wrong guess occurs in Z-Mode it is necessary to stop each Processor Element at a point that allows all instruction that are conceptually earlier than the branch, instructions with a level of conditionality that is less than or equal to the level of conditionality of the branch which was guessed wrong, within the P-Segment to complete their processing. Because the instructions executed by a Processor Element are no longer in sequence (i.e., executed out of order), one can not use the level of conditionality of individual instructions issued by a Processor Element as a guarantee that all instructions with a lower level of conditionality have been completed within a Processor Element. The manner of shutting down the processing within each Processor Element is to use the Processor Element Level of Conditionality, PELC, which is set during the E-Mode. When any Processor Element encounters a branch within the P-Segment stream, irrespective of whether the branch is assigned to that Processor Element, the Processor Element affixed to the instruction scheduled at MAX-CYCLE for that Processor Element the Level of Conditionality of the branch instruction encountered in 227 (see FIG. 2(C)). A given instruction may have its 227 overwritten multiple times but always with increasing values. The PELC guarantees that no instruction that follows the instruction labelled with a PELC=α had a level of conditionality less than or equal to α. The PELC may skip intermediate values and is therefor unsuitable as the sole basis for pruning STORE instructions within the FETCH/STORE controls. This was discussed in Section 3. Further, if the instruction is a branch all Processor Elements must increment their level of conditionality so that the next instruction is processed with the correct level of conditionality.

SECTION 5.6 Handling the Final P-Segment Instruction/Terminating the E-Mode (STEP 460)

When the final instruction within a P-Segment is encountered, each Processor Element will declare the instruction assigned to that Processor Element at the MAX-CYCLE associated with the Processor Element to be the End of Segment instruction by turning on the bit 228 (see FIG. 2C) on. The sole exception to this rule is that case when the current value of MAXCYCLE for a given Processor Element is less than EPC. In this case, the instruction position associated with EPC is filled with a no-operation NOP instruction which is flagged as the final instruction of the P-Segment. The final instruction of a P-Segment can be declared if the address of the next instruction is an entry in the Z-Code cache directory. The address of the next instruction is therefore used by the E-Mode to determine if the current instruction terminates the E-Mode and represents the final instruction of the P-Segment. The final instruction of a P-Segment is usually a branch, but in any case Processor Element 1 will generate a cachable copy of its Register Correspondence Table indexed with the current Level of Conditionality when the last instruction of the P-Segment was encountered. The SPURR will now initiate a state recovery using this level of conditionality that assures that all instructions will be completed and the pruning of the FETCH/STORE Tables is accomplished.

It has already been specified, in Section 2, that at the conclusion of any processing step, and after the recovery of state and the pruning of FETCH/STORE Tables, the next instruction address is used to search the Z-CODE cache directory to determine it the next processing interval will involve E-Mode or Z-Mode. The next instruction address agrees with a P-Segment starting address or an entry point within a P-Segment a Z-Mode processing interval is established.

SECTION 6 PROCESSING IN THE Z-MODE

The Z-Mode processing is more straight forward than the E-Mode processing as no register renaming, instruction scheduling, or caching of recovery information is required. The processing in the Z-Mode continues unit all Processing Elements have reached their last instruction or a branch wrong guess is declared. A branch wrong guess is declared by the Overall Certified Level of Conditionality (OCLC) 341 (see FIG. 3A). The branch resolution mechanism within each Processor Element communicates to the Pruning Monitor via Bus 390 the resolution of each branch instruction in the Z-Code. At any given time, the OCLC is the largest LC, such that all branches at lower levels have been resolved correctly. When a branch at the LC which is one more than the OCLC is resolved as a BWG, a branch wrong guess at this level of LC is communicated to all Processor Elements. The Processor Element that declared this branch wrong guess will communicate the correct target address to all Processing Elements when they have all quiesced, the state recovery is completed, and the FETCH/STORE Tables are pruned. In the Z-Mode, a Processor Element will quiesce following a Branch Wrong Guess once the PELC of the Processor Element is equal to or greater than the LC of the branch wrong guess. A Processor Element will continually reset its PELC based on the highest PELC 227 (see FIG. 2C) of any instruction that is assigned to it. A Processor Element automatically quiesces when it reaches the instruction whose end of segment bit 228 is turned on.

While the invention has been described in terms of a single preferred embodiment, those skilled in the art will recognize that the invention can be practiced with modification within the spirit and scope of the appended claims.

We claim:

1. A computer processing apparatus comprising:
   a memory for storing sequences of instructions;
   a plurality of execution units; and
   parallel instruction generation means for generating an alternate encoding of a first sequence of said sequences of instructions stored in said memory concurrent with execution of said first sequence of said sequences of instructions stored in said memory, wherein said alternate encoding is executable in parallel asynchronously by said plurality of execution units, and wherein said plurality of execution units interface through a common register file.

2. The computer processing apparatus of claim 1, wherein said alternate encoding comprises a plurality of subsequences of said first sequence of instructions, wherein said subsequences of instructions can be executed in parallel asynchronously by said plurality of execution units.

3. The computer processing apparatus of claim 2, wherein each of said plurality of execution units is associated with a private instruction cache for storing one of said subsequences of instructions.

4. The computer processing apparatus of claim 2, wherein said parallel instruction generation means identifies a plurality of entry points into said subsequences of instructions.

5. The computer processing apparatus of claim 2, wherein said parallel instruction generation means utilizes register renaming to generate said plurality of subsequences of said first sequence of instructions.

6. The computer processing apparatus of claim 5, wherein said parallel generation means stores a register correspondence table associated with each subsequence of instructions, wherein said register correspondence table represents a mapping between registers that are used and defined by instructions within the associated subsequence of instructions and registers of said common register file.

7. The computer processing apparatus of claim 6, wherein said register correspondence table includes an entry corresponding to each register of said common register file to which is mapped a register that is used and/or defined by instructions within the subsequence of instructions associated with the register correspondence table, wherein said entry includes availability data that represents an availability time associated with the corresponding register of said common register file.

8. In a computer processing apparatus including a memory for storing sequences of instructions and a plurality of execution units, a method for executing said sequences of instructions comprising the steps of:
   executing said sequences of instructions stored in said memory,
   concurrent with executing of a first sequence of said sequences of instructions stored in said memory, generating an alternate encoding of said first sequence of said sequences of instructions stored in said memory, wherein said alternate encoding can be executed in parallel asynchronously by said plurality of execution units, and wherein said plurality of execution units interface through a common register file.

9. The method of claim 8, wherein said alternate encoding comprises a plurality of subsequences of said first sequence of instructions, wherein said subsequences of instructions can be executed in parallel asynchronously by said plurality of execution units.

10. The method of claim 9, wherein each of said plurality of execution units is associated with a private instruction cache for storing one of said subsequences of instructions.

11. The method of claim 9, wherein further comprising the step identifying a plurality of entry points into said subsequences of instructions.

12. The method of claim 9, wherein the generating step utilizes register renaming to generate said plurality of subsequences of said first sequence of instructions.

13. The method of claim 12, further comprising the step of storing a register correspondence table associated with each subsequence of instructions, wherein said register correspondence table represents a mapping between registers that are used and defined by instructions within the associated subsequence of instructions and registers of said common register file.

14. The method of claim 13, wherein said register correspondence table includes an entry corresponding to each register of said common register file to which is mapped a register that is used and/or defined by instructions within the subsequence of instructions associated with the register correspondence table, wherein said entry includes availability data that represents an availability time associated with the corresponding register of said common register file.

15. A computer processing apparatus comprising:
   a memory for storing sequences of instructions;
   a plurality of execution units;
   parallel instruction generation means for generating an alternate encoding of a first sequence of said sequences of instructions stored in said memory concurrent with execution of said first sequence of said sequences of instructions stored in said memory, wherein said alternate encoding can be executed in parallel asynchronously by said plurality of execution units, and wherein said alternate encoding includes at least one instruction scheduled out of order and at least one speculative branch instruction; and recovery means comprising,
means for generating a branch wrong guess signal indicating that said at least one speculative branch instruction was guessed wrong, and means, responsive to said branch wrong guess signal, for controlling said execution units to halt execution of said alternate encodings upon completing execution of all instructions that precede said at least one speculative branch instruction as stored in said memory.

16. The computer processing apparatus of claim 15, wherein outcome of said speculative branch instruction is speculated based upon initial execution of said branch instruction.

17. The computer processing apparatus of claim 15, wherein said recovery means comprises:

a table storing first data representing a level of conditionality associated with each alternate encoding executed by said execution units;

means for generating second data representing a level of conditionality for said at least one speculative branch instruction;

means for controlling each execution unit to halt execution of said alternate encoding upon determining that said first data associated with said alternate encoding executed by said execution unit corresponds to said second data.

18. In a computer processing apparatus including a memory for storing sequences of instructions and a plurality of execution units, a method for executing said sequences of instructions comprising the steps of:

executing said sequences of instructions stored in said memory;

concurrent with executing of a first sequence of said sequences of instructions, generating an alternate encoding of said first sequence of said sequences of instructions stored in said memory, wherein said alternate encoding can be executed in parallel asynchronously by said plurality of execution units, and wherein said alternate encoding includes at least one instruction scheduled out of order and at least one speculative branch instruction;

generating a branch wrong guess signal indicating that said at least one speculative branch instruction was guessed wrong; and in response to said branch wrong guess signal, controlling said execution units to halt execution of said alternate encodings upon completing execution of all instructions that precede said at least one speculative branch instruction as stored in said memory.

19. The method of claim 18, wherein outcome of said speculative branch instruction is speculated based upon initial execution of said branch instruction.

20. The method of claim 18, further comprising the steps of:

generating first data representing a level of conditionality associated with each alternate encoding executed by said execution units;

generating second data representing a level of conditionality for said at least one speculative branch instruction; and controlling each execution unit to halt execution of said alternate encoding upon determining that said first data associated with said alternate encoding executed by said execution unit corresponds to said second data.

* * * * *